United States Patent Office.

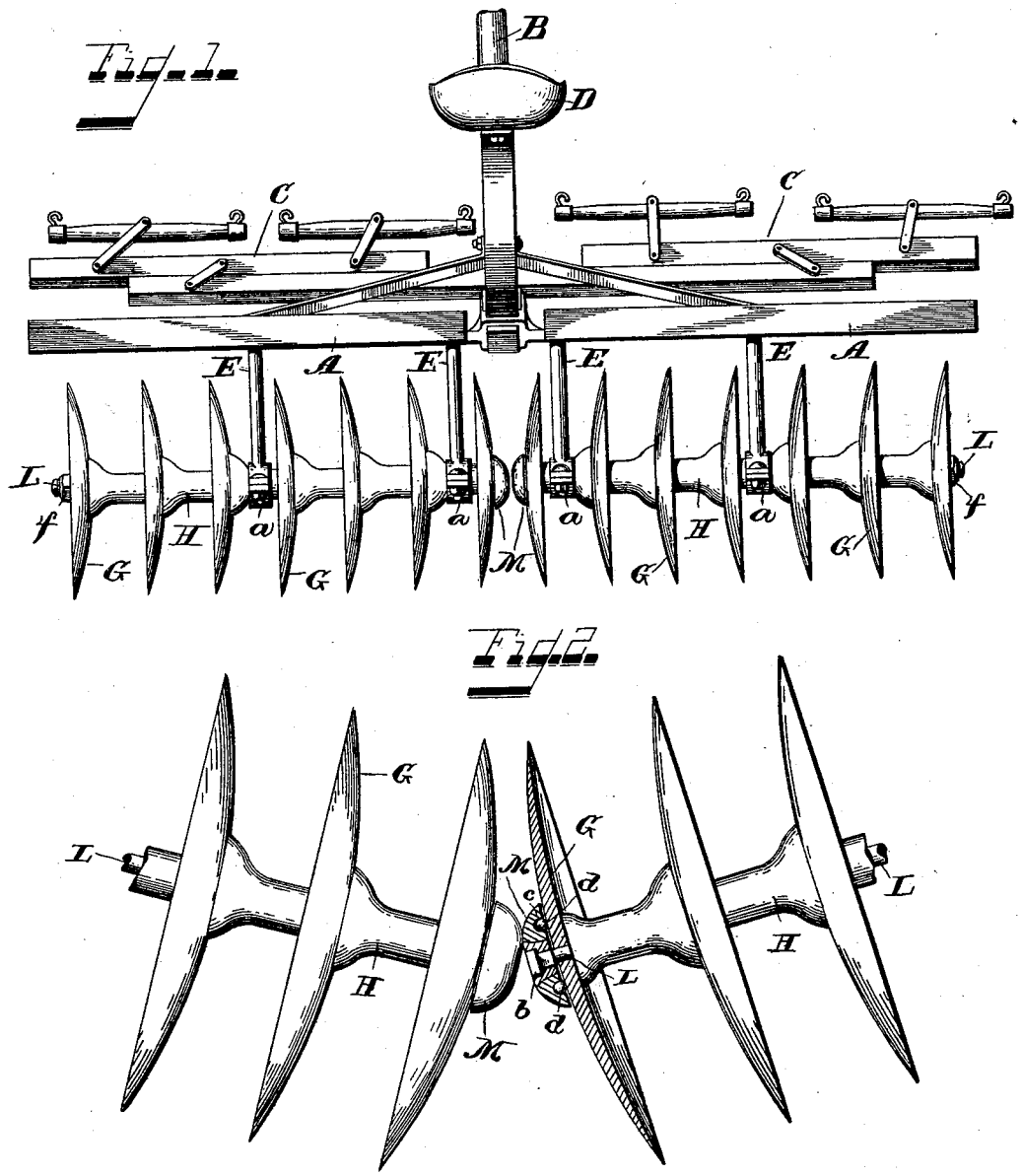

PETER E. LITTLE, OF DAYTON, OHIO, ASSIGNOR TO THE OHIO RAKE COMPANY, OF SAME PLACE.

DISK HARROW.

SPECIFICATION forming part of Letters Patent No. 591,555, dated October 12, 1897.

Application filed May 24, 1897. Serial No. 637,860. (No model.)

*To all whom it may concern:*

Be it known that I, PETER E. LITTLE, a citizen of the United States, residing at Dayton, in the county of Montgomery and State of Ohio, have invented certain new and useful Improvements in Disk Harrows, of which the following is a full, clear, and exact description, reference being had to the accompanying drawings, forming part of this specification.

My invention relates to that class of disk harrows in which the disks are mounted in gangs hinged to a suitable frame and arranged to be adjusted at an angle to the line of draft. When the gangs are thus adjusted at an angle, the strain on the gangs as they are driven forward tends to throw the inner or abutting ends of the gangs together. It has long been common, therefore, in this connection to employ buffer-heads at the inner abutting ends of the gangs to receive this side thrust and to prevent the two innermost disks from coming together. These buffer-heads have either been fixed solidly on the ends of the gang-axles or they have been arranged to revolve independently of the disk gangs, or the inner ends of the gangs have been coupled or tied together with universal joints of various kinds; but however arranged in these older constructions the buffer-heads have been mounted on or around the gang-axles, so that the strain on the heads has been transferred through the axles to the journal-bearings by means of which the gangs are hinged and coupled to the frame. The result of this has been that the journal-bearings are subjected to extra strain and wear and the journal-boxes must frequently be renewed or replaced. It is to overcome these defects that my invention is directed; and it consists in a certain novel construction of buffer-head, to be hereinafter pointed out and claimed, whereby the strain may be removed from the gang-axles and transferred to the convex surface of the innermost disks at a point some distance from the line of the axle.

In the drawings, Figure 1 is an end elevation of my disk harrow. Fig. 2 is a top plan view of the abutting ends of the disk gangs partly in horizontal section.

A represents any suitable framework, with tongue B, whiffletree C, and driver's seat D.

E E are the hangers attached to the frame and to which are journaled, in suitable boxes *a a*, the gangs of disks. These disk gangs are made up, in the usual way, with concavo-convex disks G G, mounted on axle-rods and separated by spools H H, as many disks being employed as desired for the width of the implement, and the whole arranged in two gangs in line and adapted to be adjusted at an angle to each other and to the line of draft by adjusting mechanism of any of the well-known constructions. (Not shown in the drawings.)

As shown in Fig. 2, the inner end of the gang-axle L is fitted with a washer *b*, recessed to receive and hold the end of the axle, the other end of the axle being provided with a nut *f* for drawing together and holding the disks and spools of the gang in place in the usual way. Mounted loosely on the washer *b* is the buffer-head M, held in place by the slight flare of the washer, but free to rotate thereon in either direction. An annular groove *c* is formed in the under surface of the buffer-head about midway between the center and periphery, and in this recess are placed a series of hardened-steel balls *d* of a size sufficient to serve as a bearing between the buffer-head and disk and sufficient to prevent any other contact between the two. The other disk gang is equipped at its inner end in the same way, although the ordinary fixed head may be employed when desired.

As already stated in a foregoing paragraph, I am aware that in disk harrows antifriction devices of various kinds have been heretofore employed interposed between the inner ends of the disk gangs, and I do not therefore claim, broadly, such a construction.

It will be evident from my construction that, while the buffer-head rotates on the washer in the usual way, when the disk gangs are adjusted for use at an angle to the line of draft the side thrust of the gangs will be received by the inner disk at a point some distance from the axle on the balls *d d*, and thus the strain will be borne by the disks and not by the journal-boxes, as in the ordinary constructions.

Having thus described my invention, what I claim, and desire to secure by Letters Patent, is—

1. In a disk harrow, the combination, with the disk gang, of a buffer-head mounted to rotate on the inner end of the gang, and provided with an annular groove on its under surface, with a series of balls carried in said groove of a diameter slightly in excess of the depth of the groove and bearing against the surface of the innermost disk, to receive the thrust of the opposing disk gang, substantially as shown and described.

2. In a disk harrow, the combination, with the disk gangs, of a pair of buffer-heads mounted to rotate on the inner ends of the gangs, and each provided with concentric annular grooves on their under surfaces, with a series of balls carried in said grooves of a diameter slightly in excess of the depth of the grooves, and bearing against the surface of the innermost disks of each gang, substantially as shown and described.

PETER E. LITTLE.

Witnesses:
   O. F. DAVISSON,
   KATHARINE P. EVANS.